Oct. 18, 1949.　　　　F. E. BACHMAN　　　　2,485,082
COMPOSITE BRAKE ROTOR

Filed May 8, 1946　　　　　　　　　　　2 Sheets-Sheet 1

INVENTOR.
Fred E. Bachman,
BY
Atty.

Oct. 18, 1949.  F. E. BACHMAN  2,485,082
COMPOSITE BRAKE ROTOR
Filed May 8, 1946  2 Sheets-Sheet 2
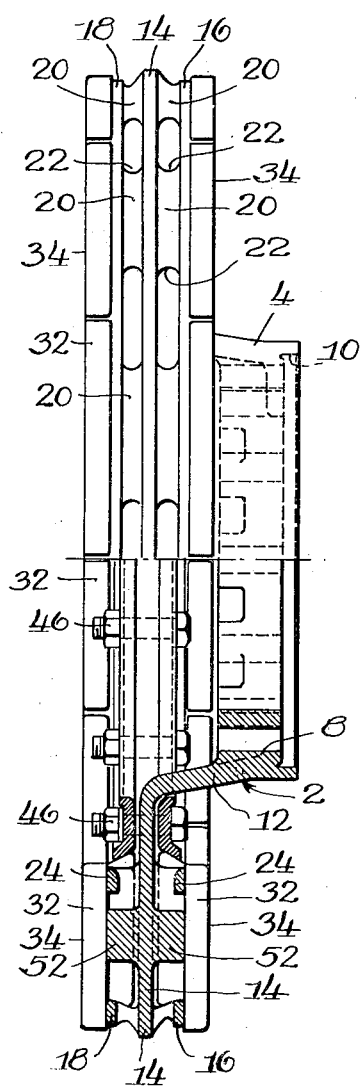
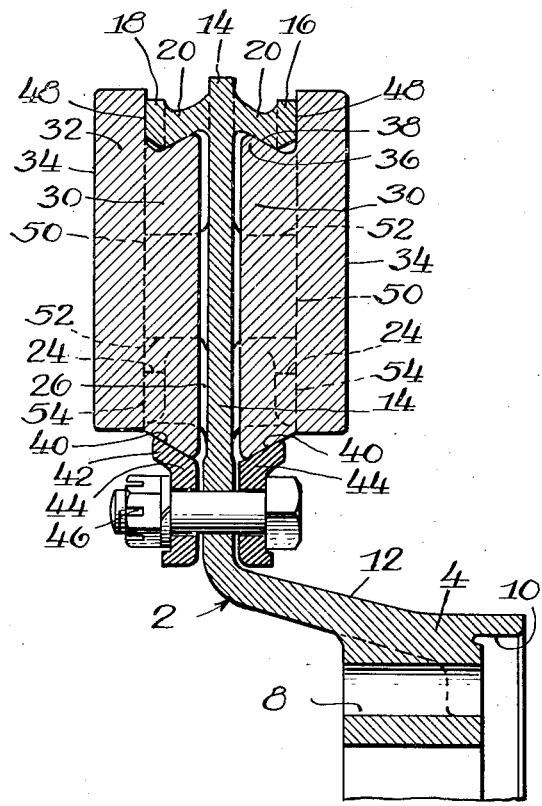
INVENTOR.
Fred E. Bachman
BY
Orin O. B. Garner
Atty.

Patented Oct. 18, 1949

2,485,082

UNITED STATES PATENT OFFICE 2,485,082

COMPOSITE BRAKE ROTOR

Fred E. Bachman, Chicago, Ill., assignor to American Steel Foundries, Chicago, Ill., a corporation of New Jersey Application May 8, 1946, Serial No. 668,203.

16 Claims. (Cl. 188—218)

My invention relates to a brake rotor and more particularly to a novel form of such device designed for use on railway braking equipment wherein high speed braking results in the development of excessive heat and therefore requires special structural arrangements.

A specific object of my invention is to devise a composite brake rotor comprising a central spiderlike member to which may be secured a series of segmental blocks having friction surfaces against which the usual brake shoe may bear as the rotor revolves.

Another object of my invention is to devise such a rotor structure in which the brake surface may be so arranged as to accommodate radial growth which normally occurs under service conditions as a result of the centrifugal forces and in combination with the high temperatures developed. It is known that such growth results in permanent deformation under such conditions.

A different object of my invention is to devise a multipiece rotor comprising a central spider member having a central plate with integrally formed rings spaced at opposite sides thereof adjacent the outer periphery of said plate and integral webs connecting said rings and said plate together with a series of studs on said plate radially aligned with said webs, the extremities of said studs on each side of said plate being aligned with the outer surfaces of the adjacent rings to afford seating means for associated removable braking segments.

My invention contemplates such an arrangement as that set forth in the last object wherein a locking ring may have wedge engagement with the segmental blocks at each side of the central plate and thus act as securing means fixing the segmental blocks in proper aligned relationship on the central spider.

My invention further contemplates a composite rotor structure for association with the wheel and axle assembly of a railway vehicle, said rotor being so constructed and arranged as to permit the application or removal of its friction surfaces without dissociating the rotor from the supporting wheel and axle assembly, thus permitting relatively economic application of new braking surfaces on rotors in a relatively short space of time and without requiring the car to be taken out of service and sent to the shop.

Certain features disclosed herein relating to the torque or driving connections and the securing connections between the support and the friction segments are claimed in my copending United States application, Serial No. 668,204, filed May 8, 1946 for Rotor.

In the drawings, Figure 1 is a side elevation of my novel form of composite brake rotor structure.

Figure 2 is a top or edge view thereof, half in section, the section being taken approximately in the radial plane indicated by the line 2—2 of Figure 1.

Figure 3 is a relatively enlarged sectional view taken approximately in the transverse radial planes indicated by the line 3—3 of Figure 1.

Figure 1:
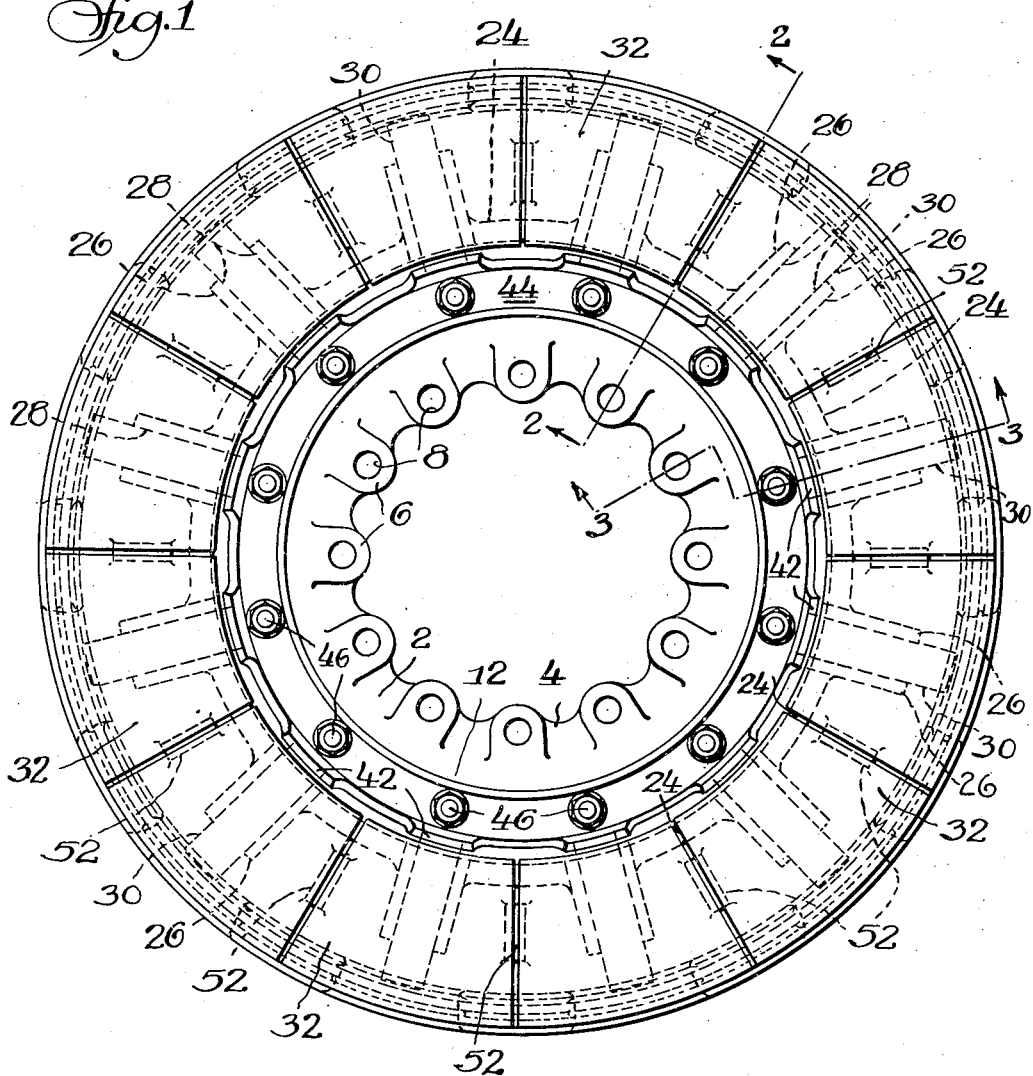

My novel composite rotor comprises a central member or spider, generally designated 2, having the usual hub portion 4 about which may be a series of lugs 6, 6 with the openings 8, 8 affording connecting means in the usual manner to a supporting member such as the hub of a wheel which may be received within the center bore 10 of said hub portion. The hub portion 4 of the spider 2 may have a flaring portion 12, merging with the vertical central plate 14 and integrally formed with said center plate 14, adjacent the outer periphery, and on opposite sides thereof, may be the annular rings 16 and 18, said rings and said plate being joined by the integral circumferential webs 20, 20 equally spaced about the outer perimeter of said spider with intermediate openings 22, 22 therebetween.

Spaced about the inner perimeter of the plate 14 may be a series of arcuate webs 24, 24 alternately arranged with respect to the before-mentioned webs 20, 20, said arcuate webs 24, 24 merging at their extremities with substantially radially arranged guide members or fingers 26, 26. The opposite faces 28, 28 of adjacent guide fingers 26, 26 are parallel and define a guideway or slot between which may be received the central radial guide lug 30 of tonguelike form of the associated segmental member 32, sometimes designated rotor segment. The fingers 26 and lugs 30 provide driving connections between the spider and the members 32.

Each member 32 is segmental in form and may have on its outer face the friction surface 34 for engagement with the friction shoe normally associated with such a rotor.

The central lug 30 of each segment 32 may have at its outer extremity a projecting lip portion 36 having a diagonally arranged arcuate face in complementary engagement as at 38 (Figure 3) with the undercut inner face of the adjacent web 20, and the opposite end of the guide lug or tongue 30 may have a sloping arcuate face in complementary engagement as at 40 with the wedgelike segmental flange 42 on the securing ring 44, and the securing rings for the segments on opposite faces of the rotor may be fixed thereto by a series of bolt and nut assemblies 46, 46 projecting through aligned openings therein.

It will thus be seen that each segment 32 has its outer extremity seated as at 48 (Figure 3) against the flat face of the adjacent ring 16 or or 18, being held thereagainst by the wedging action afforded by engagement of the tongue 30 against the undercut face at 38, while a central portion of the segment bears at 50 (Figure 3) against the adjacent lug 52 (Figure 2), a series of which may be formed on each face of the plate 14 so positioned as to afford spaced seats for the edges of the friction segments, as clearly seen in the side elevation view of Figure 1. It is understood, of course, that the outer faces of the studs or lugs 52, 52 are vertically aligned with the outer faces of the rings 16 and 18 as well as with the outer faces of the webs 24, 24 against which the segments may seat as at 54, 54 (Figure 3).

It will thus be seen that in my novel design of segmental rotor I have provided a design which will accommodate the growth or expansion already referred to and which, at the same time, will facilitate application or removal of the rotor segments upon which the friction faces are formed without removing the rotor from the wheel and axle assembly or taking the car out of service. To those skilled in the art, it will be readily apparent that the securing ring 44 by its wedge engagement against each rotor segment is operative to seat each segment against the associated surfaces provided on portions of the central spider and that when the whole is properly assembled, a satisfactory unitary structure is provided which is suitable for the severe service for which it is designed.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A composite brake rotor comprising a central spider having a hub portion and a vertical plate, spaced circumferential webs integrally joined to said plate adjacent the outer periphery thereof, rings carried by said webs, a series of studs annularly spaced about said plate inwardly of said rings on each face thereof and having their remote faces aligned with corresponding faces of said rings, a series of segmental friction members seated on said faces at opposite sides of said plate in wedge engagement with the respective rings, wedge securing means associated with each series, each of said securing means being a single member bearing against all of the segmental friction members of one series, and tension means fixed between respective securing means, said tension means also fixing said securing means to said plate.

2. A composite brake rotor comprising a central spider having a hub portion and a vertical plate, spaced circumferential webs integrally joined to said plate adjacent the outer periphery thereof, rings carried by said webs, a series of studs annularly spaced about said plate inwardly of said rings on each face thereof and having their remote faces aligned with corresponding faces of said rings, a series of segmental friction members seated on said faces at opposite sides of said plate in wedge engagement with the respective rings, wedge securing means associated with each series, each of said securing means being a single member bearing against all of the segmental friction members of one series, and tension means fixed between respective securing means.

3. A composite brake rotor comprising a central spider having a hub portion and a vertical plate, spaced circumferential webs integrally joined to said plate adjacent the outer periphery thereof, rings connected to said webs, a series of studs annularly spaced about said plate inwardly of said rings on each face thereof and having their remote faces aligned with corresponding faces of said rings, a series of segmental friction members seated on said faces at opposite sides of said plate in wedge engagement with the respective rings, and wedge securing means associated with each series, each of said securing means being a single member bearing against all of the segmental friction members of one series.

4. A built-up brake rotor comprising a central spider with a vertical plate, spaced annular rings integrally fixed to said plate adjacent the outer periphery thereof, segmental friction members arranged about the periphery of said plate on opposite faces thereof and bearing against said rings, each of said members bearing against means on said spider remote from said rings, and wedge securing means of said members, each of said wedge means comprising a single ring engaging all the friction members on one side, and tension means urging said rings toward each other.

5. A built-up brake rotor comprising a central spider with a vertical plate, spaced annular rings integrally fixed to said plate adjacent the outer periphery thereof, segmental friction members arranged about the periphery of said plate on opposite faces thereof and bearing against said rings, each of said members bearing against means on said spider remote from said rings, and wedge securing means for said members, each of said wedge means comprising a single ring engaging all the friction members on one side, and tension means urging said rings toward each other and fixing said rings to said plate.

6. A composite brake rotor comprising a central spider having a hub portion and a vertical plate, spaced circumferential webs integrally joined to said plate adjacent the outer periphery thereof, rings connected to said webs, a series of studs annularly spaced about said plate inwardly of said rings on each face thereof and having their remote faces aligned with corresponding faces of said rings, a series of segmental friction members seated on said faces at opposite sides of said plate in wedge engagement with respective rings, and wedge securing means associated with each series.

7. A composite rotor comprising a spider having a hub portion and a plate portion with radially arranged slots formed on opposite faces thereof, segmental friction members having portions in guiding engagement with said slots on each face of said plate, each of said friction members having wedge engagement with means on said plate, and an annular member on each side of said plate having wedge engagement with all of the adjacent friction members.

8. A brake rotor comprising a central spider with a hub and a plate, said plate having a series of radially arranged grooves on each face thereof with alternately arranged studs between said grooves, segmental friction elements having tongue means in guiding engagements with said grooves and each in abutment with adjacent studs, and wedge means fixing each friction element to said plate.

9. A composite rotor comprising a central member or spider having a hub portion for association with securing means, a series of friction-faced segments mounted on opposite faces of said spider about the periphery thereof, and securing means for said segments, said securing means comprising wedge rings engaging the segments on respective faces of said spider, and tension means for urging said rings toward each other.

10. A rotatable friction assembly comprising a support structure, an annular series of spaced friction elements at opposite sides of said structure, a driving connection between each element and said structure, whereby rotation of said structure effects rotation of said elements, spaced means on said structure between said connections affording seats for said elements adjacent their lateral edges, means on said structure affording seats for said elements along their radially inner and outer edges, and means securing said elements to said structure.

11. A composite rotor comprising a central member or spider having a hub portion for association with maintaining means, a series of friction-faced segments mounted on opposite faces of said spider about the periphery thereof, securing means for said segments, said securing means comprising a wedge ring for engagement with the segments on each face of said spider, and means extending through said member and each ring securing the same to each other and drawing the rings toward each other.

12. A composite rotor comprising a spider having a hub portion and a plate portion, said plate portion having radially arranged slots formed on opposite faces thereof, segmental friction members having portions on their inner sides in guiding engagement with said slots on each face of said plate, and wedge means at the radially inner and outer extremities of said portions in wedge engagement therewith and connected to said spider.

13. A brake rotor comprising a spider including a radially extending plate, friction elements mounted on each side of said plate, securing means for said elements on said plate in wedge engagement with the radial extremities of said elements, and tension means urging certain of said means toward said plate and into said engagement with said elements.

14. In a brake rotor, a member including a plate having outstanding portions on each side thereof, a series of friction members on each side of said plate seated on the adjacent portions and interlocked against circumferential movement relative to the plate with certain of said portions, and wedge means on said plate in wedge engagement with said members and cooperating with said certain portions for securing said members in position on said plate.

15. A spider for a brake rotor including a hub and a radially extending plate, spaced annular structures integrally fixed to said plate adjacent the outer periphery thereof and presenting on their inner edges wedge surfaces diverging toward said plate, spaced radial guide members arranged in pairs on each side of said plate, the guide members of each pair defining a guide slot therebetween, bosses on said plate between adjacent pairs of guide members intermediate the inner and outer peripheries of said plate and extending lengthwise radially of said plate, and arcuate webs on said plate adjacent the inner periphery thereof and each disposed between adjacent pairs of guide members and merging with one of the guide members of each of said adjacent pairs, said structures, guide members, bosses and webs affording seats for associated friction elements.

16. A spider comprising a plate, pairs of spaced radially extending guide members on each side of the plate, wedge means on the plate adjacent each pair of guide members in radial alignment with a guide slot defined by the members of the pair, and friction shoe seating means between said pairs of guide members and connected to adjacent members, adjacent means and members presenting coplanar seats spaced from said plate for seating associated shoes.

FRED E. BACHMAN.

REFERENCES CITED

The following references are of record in the file of this patent:

UNITED STATES PATENTS

| Number | Name | Date |
|---|---|---|
| 1,423,833 | Craighead | July 25, 1922 |
| 1,617,781 | Yungling | Feb. 15, 1927 |
| 1,847,714 | Gillies | Mar. 1, 1932 |
| 2,236,311 | Eksergian | Mar. 25, 1941 |

FOREIGN PATENTS

| Number | Country | Date |
|---|---|---|
| 19,951 | Great Britain | Sept. 2, 1912 |
| 171,503 | Great Britain | Nov. 24, 1921 |
| 309,388 | Italy | Sept. 24, 1932 |
| 324,455 | Great Britain | Jan. 30, 1930 |
| 371,834 | Great Britain | Apr. 22, 1932 |